(12) United States Patent
Lundberg et al.

(10) Patent No.: US 7,801,797 B2
(45) Date of Patent: Sep. 21, 2010

(54) TRADING SYSTEM SUPPORTING CREDIT RATING

(75) Inventors: Jonas Lundberg, Stockholm (SE); Ulf Ahlenius, Bromma (SE)

(73) Assignee: OMX Technology AB, Stockholm (SE)

( * ) Notice: Subject to any disclaimer, the term of this patent is extended or adjusted under 35 U.S.C. 154(b) by 1347 days.

(21) Appl. No.: 10/462,814

(22) Filed: Jun. 17, 2003

(65) Prior Publication Data

US 2004/0260639 A1 Dec. 23, 2004

(51) Int. Cl.
G06Q 40/00 (2006.01)
(52) U.S. Cl. .......................... 705/37; 705/35
(58) Field of Classification Search .............. 705/35, 705/37
See application file for complete search history.

(56) References Cited

U.S. PATENT DOCUMENTS

| | | | |
|---|---|---|---|
| 5,136,501 A | | 8/1992 | Silverman et al. |
| 5,375,055 A | * | 12/1994 | Togher et al. .................. 705/37 |
| 5,420,926 A | * | 5/1995 | Low et al. ...................... 705/74 |
| 5,924,083 A | * | 7/1999 | Silverman et al. ............. 705/37 |
| 6,014,627 A | * | 1/2000 | Togher et al. ................... 705/1 |
| 6,311,171 B1 | * | 10/2001 | Dent ............................ 705/64 |
| 6,317,727 B1 | * | 11/2001 | May .......................... 705/36 R |
| 6,421,653 B1 | * | 7/2002 | May .......................... 705/36 R |
| 7,130,789 B2 | * | 10/2006 | Glodjo et al. .................. 705/37 |
| 7,133,842 B2 | * | 11/2006 | Harif ............................. 705/37 |
| 7,159,116 B2 | * | 1/2007 | Moskowitz .................. 713/176 |
| 7,565,313 B2 | * | 7/2009 | Waelbroeck et al. .......... 705/37 |
| 2001/0025271 A1 | * | 9/2001 | Allen ........................... 705/65 |
| 2002/0156719 A1 | * | 10/2002 | Finebaum et al. ............. 705/37 |
| 2002/0169706 A1 | * | 11/2002 | Chandra et al. ............... 705/37 |

FOREIGN PATENT DOCUMENTS

| | | |
|---|---|---|
| JP | A-2001-249689 | 9/2001 |
| JP | A-2001-520421 | 10/2001 |
| WO | WO9919821 | 4/1999 |

OTHER PUBLICATIONS

Translation of Japanese official action, Jul. 3, 2009, in corresponding Japanese Application No. 2006-515802.

* cited by examiner

*Primary Examiner*—Jagdish N Patel
*Assistant Examiner*—Kenneth Bartley
(74) *Attorney, Agent, or Firm*—Nixon & Vanderhye P.C.

(57) ABSTRACT

In a trading system providing an anonymous market, orders in the market are executed using cryptographic keys. Traders can view the orders and use their specific key to determine the particular rating of an order in accordance with the trader's own preferences. Since the same order information is sent to all traders, the bandwidth and processing requirements are kept at a minimum.

31 Claims, 4 Drawing Sheets

|     | 310 | 320 |
|-----|-----|-----|
| 312 | x   | G   |
| 314 | x   | Y   |
| 322 | Y   | x   |
| 324 | R   | x   |

Fig. 4

TRADING SYSTEM SUPPORTING CREDIT RATING

TECHNICAL FIELD

The present invention relates to an automated exchange system, and in particular to an automated exchange designed to execute orders given certain trading constraints.

BACKGROUND

In automated trading of financial instruments different trading parties, members of the exchange, send in their orders to the computerized exchange which tries to match the orders with other orders received previously. If the order cannot be matched directly the order can be stored in an orderbook and displayed to other trading parties connected to the automated exchange. The orders can be displayed either indicating what trading party has placed the order or not indicating what trading party has placed the order. If there is no indication of what trading party has placed a particular order, this is usually termed an anonymous market.

An anonymous market is in many cases preferable to a market where all trading parties (members) can see who has placed a particular order. However, in some markets there are potential differences between the orders, and more specifically, differences between customers that own the order. In particular there may be counter party risk involved. The counter party risk is the expected cost of possible credit and "moral hazard" losses associated with the chance that a financial counterparty will default on its contractual obligation.

In most exchange traded derivative markets the clearinghouse clears almost all orders. Hence the participants know the counter party risk of any order executed on this market. However, in some other markets, like for example the bond, currency, and warrants markets the trading is usually anonymous, but the full counter party exposure usually still exists when trading. In order to counter balance this some firms may be restricted on the counter parties with which they can trade. But, since the market is anonymous, the trader needs to obtain information on the owners of the orders in the market or at least information if the trader is allowed to trade against the order in the market.

One possible way that may be employed to solve this problem is to send information instructing the automated exchange not to match against orders placed by certain trading parties. For example the U.S. Pat. No. 5,136,501 discloses a matching system for automatically matching bids and offers for given trading instruments where counter party credit information is used to block trades in excess of a counter party credit limit. In the system disclosed in U.S. Pat. No. 5,136,501, the parties trading in the system cannot identify the bids and offers that will result in a blocked trade before trying to execute a particular trade. Hence, a trader will not know if an order is allowed until the trader tries to match that particular order, and the system then either accepts the deal or blocks the trade.

This problem is overcome by the system disclosed in the U.S. Pat. No. 5,375,055 where the system is supplemented by a number of pre-screening nodes that screens all bids and offers that would result in a blocked trade. The system as described in U.S. Pat. No. 5,375,055 will require a large number of additional screening devices connected to the automated exchange, in particular if the number of different trading parties is big.

A similar solution is described in U.S. Pat. No. 5,924,083. Like U.S. Pat. No. 5,375,055, the system disclosed in U.S. Pat. No. 5,924,083 requires additional hardware. In U.S. Pat. No. 5,924,083, a number of intelligent nodes are added to accomplish the task of filtering orderbook information. An additional drawback of the systems as described in the U.S. Pat. Nos. 5,924,083 and 5,375,055 is that only tradable orders are displayed to each trader, thereby depriving the trader of valuable market information.

A further drawback of all these systems is that the decision on what orders that are tradable is "hard". Thus, in the case of the system as described in U.S. Pat. No. 5,136, 501, a trade between parties having exceeded their credit limit will be blocked unless the credit limits are changed. In the case of the systems described in U.S. Pat. Nos. 5,924,083 and 5,375,055 the orders that would result in a trade exceeding the credit limit are not even displayed to the traders. However, in some cases the trading parties may not want to apply a hard (on/off) determination on what counterparties to enter into a transaction with, but rather a recommendation (soft determination) on which orders to trade against. Preferably the system should also provide information on the entire market and not only the orders the trader is allowed to trade against.

SUMMARY

It is an object to provide a method and a system wherein an anonymous market can be upheld, and where at the same time the parties can identify orders placed by counter parties that they do not want enter into a deal with.

It is a further object to provide a method and a system that provides a cost efficient infrastructure and that is not dependent on filtering nodes and the like in the overall architecture.

It is yet another object to provide a method and a system whereby the traders can view the entire orderbook, including the orders he should not trade against.

It is yet a further object to provide a method and a system whereby a trader can receive credit rating based recommendations in the trading against different orders.

These objects and others are obtained in a system and a method as set out in the appended claims. The technology also extends to a server and a trading terminal for use in such a system in accordance with the appended claims.

All orders in the market are executed using cryptographic keys. All traders can view all orders and use their specific key to determine the particular rating of the order in accordance with the traders own preferences. Since the same order information is sent to everybody, the bandwidth requirements will be kept at a minimum, and also the processing will be kept at a minimum.

Each trader receives a unique key that can be used to rate all orders in the market from the trader's rating of the different possible counter parties. If the rating changes intraday for a specific trader, that trader receives a broadcast with the new key value, but no other system configurations or settings have to be changed. In this way, the processing is kept to a minimum. In the case when two traders give the same rating to all counter parties, they are preferably not given identical keys in order to maintain a high level of security. Further, the key is preferably also only enabled with the specific signature of the authorized logged in user and can thus not be exported to someone else to determine the rating of the first trader.

The rating settings of each particular trader can then be used to code the orders in the market for each trader in accordance with that trader's user preferences. In particular each displayed order may be colored in a color reflecting the status of each order with respect to the credit rating of each trader. For example the system may provide for three levels of credit rating:

Forbidden: Which the trader is NOT allowed to trade against.

Restricted: Which the trader is allowed against but the counter party is getting close to becoming forbidden.

No restriction: The trader may trade freely:

The orders in the market can for example be color-coded so that forbidden orders are red, restricted orders are yellow, and not-restricted orders are green. The trader can then use these colors to determine which order to trade against.

The rating of counter parties may be done centrally by the risk department of a member for all its traders. In this case an individual may not know which counter parties are forbidden, restricted or non-restricted.

The restrictions will in accordance with one preferred example embodiment not only be done in the front-end application, but also in the matching process. If an order is sent in from one trader, which order would trade against another order in the order book if no restrictions were present, that order will not trade if the owner of the order is rated "forbidden." Of course, the order may match against another order further down in the order book if conditions allow that.

However, in another preferred example embodiment, the fact that a particular order is colored red does not automatically result in that trade being rejected by the system. Instead, the response(s) permitted for this situation can be set locally by each trading party or the system operator centrally.

BRIEF DESCRIPTION OF THE DRAWINGS

FIG. 4 is a view of an example credit matrix.

DETAILED DESCRIPTION

Figure 1:
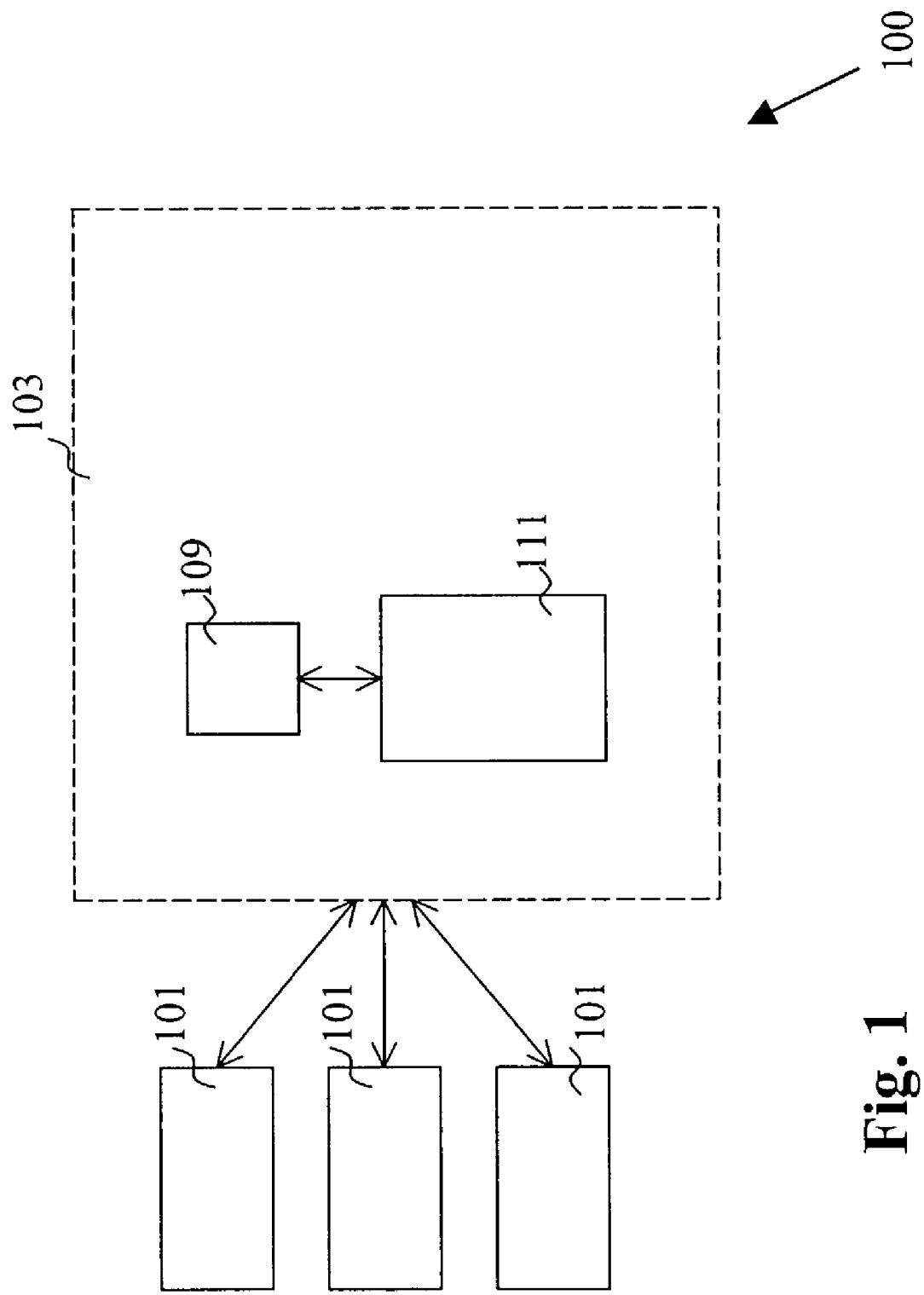
FIG. 1 is a general view of an automated exchange system.

In FIG. 1, a general view of an automated exchange system 100 is shown. The system comprises a number of remote terminals 101 all connected to a central computer server 103 comprising a matching unit 109 including a computer processor, and an order book (memory) 111 associated therewith. The central computer server 103 is loaded with suitable automated trading exchange software, such as the CLICK™ software sold by OMX Technology AB, Sweden, and forms an automated exchange having all features and functionality of an automated trading exchange. The remote terminals 101 are designed to send data to and receive data from the central computer server 103. The terminals 101 are further designed to provide an interface for investors, such as broker firms etc., trading contracts including combination contracts at the automated exchange. The matching of orders input in such a system is performed in the central computer server by the unit 109 designed for this task.

Figure 2:
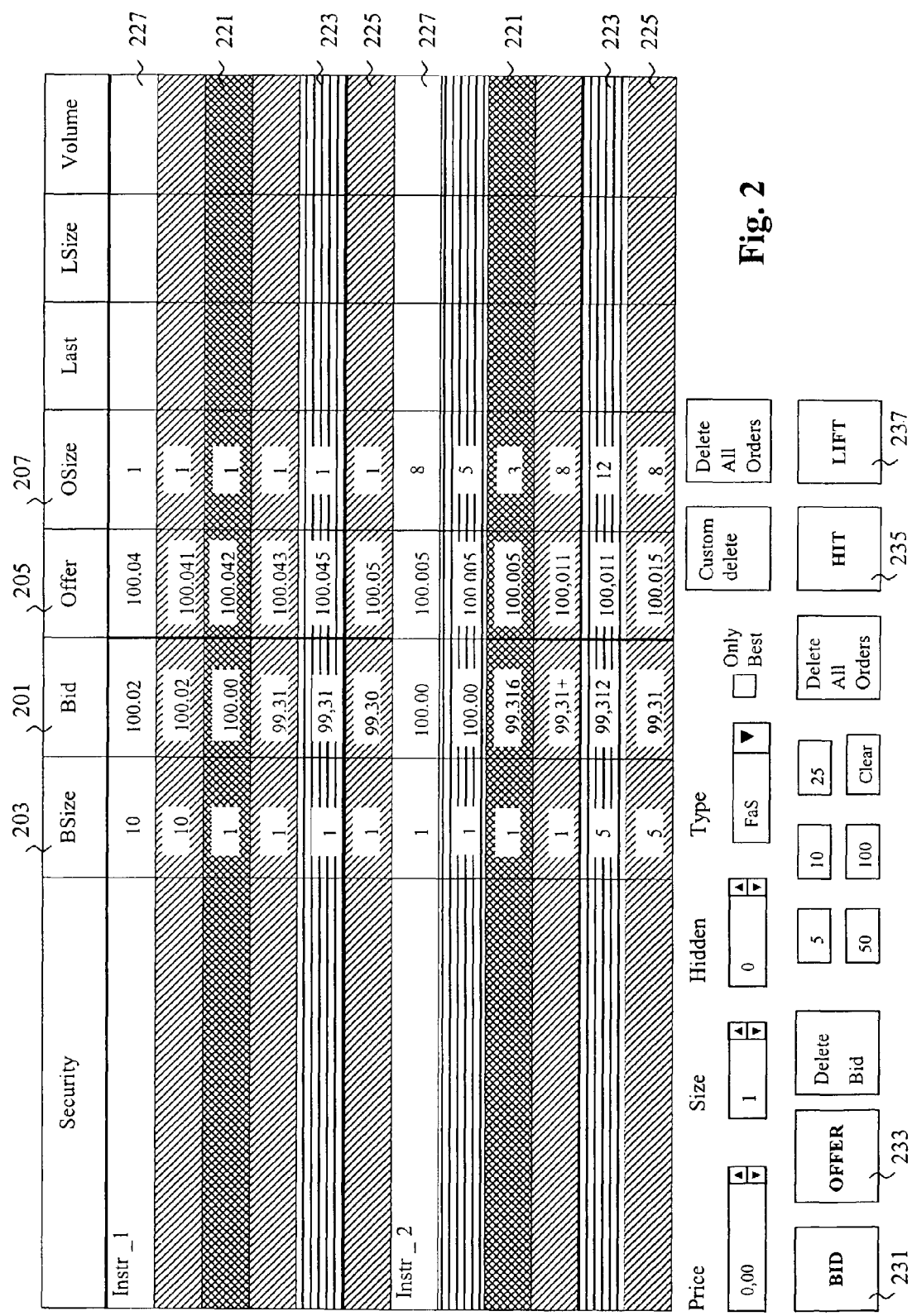
FIG. 2 is a screen shot of a trader screen illustrating the graphical user-interface when trading against credit rating coded orders.

In FIG. 2, a view illustrating an example screen shot in a system as described herein is shown. The screen displays in a conventional manner the instruments traded Instrument_1, Instrument_2 etc., the Bid price 201 and the respective Bid size 203, the Offer price 205 and the respective Offer size 207. Typically, there are also conventional input mechanisms in the form of a "Hit" button 235 for accepting a pending bid, a "Lift" button for accepting a pending offer a "Bid" button 231 for placing a bid on the market and an "Offer" button 233 for placing an offer on the market. Additional buttons and associated input mechanisms to facilitate input of orders to the automated exchange system may also be provided.

All orders currently entered into the system in a particular instrument are displayed to all traders connected to the centrally located server hosting the matching unit and its associated order book so that the entire content of the orderbook is available to all traders making use of the trading system. In order for each trader to know which orders the trader is allowed to trade against each order is displayed indicating the credit rating status thereof. In this example the system makes use of three different colors to communicate this information to each trader. It is understood that an arbitrary number of levels can be used.

RED—Forbidden: Which the trader is NOT allowed to trade against.

YELLOW—Restricted: Which the trader is allowed against but the counter party is getting close to becoming forbidden.

GREEN—No restrictions: The trader may trade freely.

The coloring is made in the system in response to the mutually established credit limits established for each respective trading party. In the example depicted in FIG. 2, a three color credit rating coding of orders is employed as described above. For example the orders on the lines denoted 221 are Red, the orders on the lines 223 are Yellow and the orders on the lines 225 are Green. All lines having the same pattern have the same color code. Additionally, in this example, the top lines for each listed instrument is white and displays for each instrument the aggregated volume at the best price for both sides of the orderbook.

In accordance with another non-limiting embodiment, the orders that a trader is forbidden to trade against are not displayed to the trader. The local trading terminal of the system filters out any orders coded as forbidden and only display orders that the trader may trade against.

Figure 3:
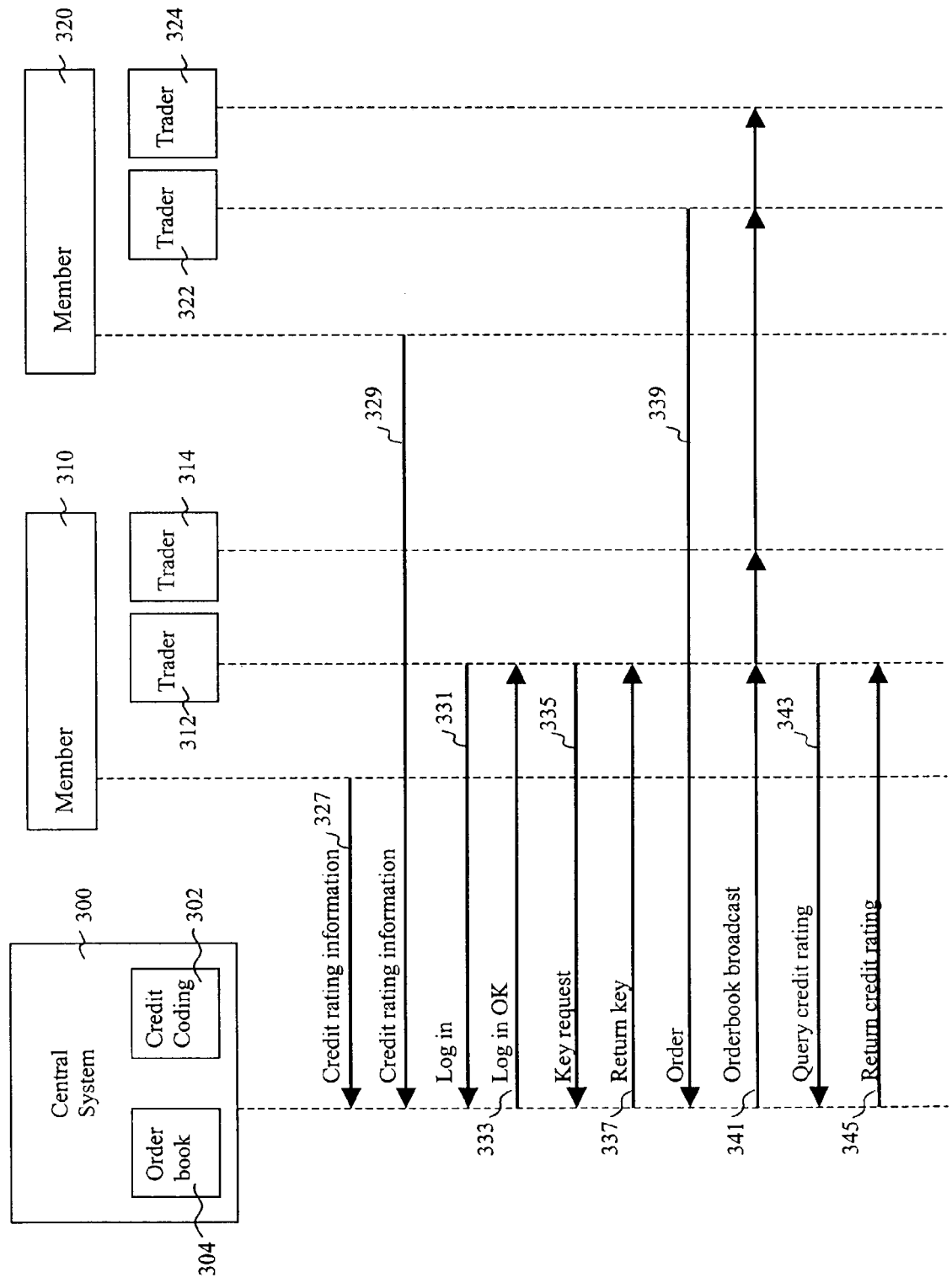
FIG. 3 is a flowchart illustrating steps performed when updating the credit rating preferences of a user.

In FIG. 3, a flow chart illustrates information exchanged between the centrally located server 300 hosting a matching unit and an associated orderbook 304 of the trading system and a number of trading parties 312, 314, 322 and 324 connected to the central server 300. In the example depicted in FIG. 3, each trading party is associated with a member 310 and 320, respectively. In this example, the trading parties 312 and 314 are associated with the member 310, and the trading parties 322 and 324 are associated with the member 320. For the sake of simplicity and clarity, only two members having two trading parties each are shown in FIG. 3. Of course, there can be an arbitrary number of members having an arbitrary number of trading parties associated therewith. The members 310 and 320 are the entities to which the trading stations 312, 314 and 322, 324, respectively belong, and in whose name a particular trader trades. For example, the member 320 may be UBS Warburg, and the trader 322 may be a computer terminal from which a trader of UBS Warburg connects to the central system 300.

Furthermore, in addition to a conventional central server as depicted in FIG. 1, the central system 300 comprises a credit coding and rating module 302. The module 302 can store information relating to credit rating for all traders that can connect to the system. In a non-limiting example embodiment, the credit rating is established by the members with respect to other members and transmitted to the central system with a suitable periodicity. The credit rating can be the same for all of a member's traders with respect to a particular counter party, or in a non-limiting example embodiment, individual for different traders with respect to a particular counter party. Since different traders usually trade different instruments, it can be of interest for the member to set different credit rating for the same counter party for different traders.

When making use of the credit coding as described herein the following messages may be exchanged in a trading session sequence. First, each member transmits its credit rating information, preferably for each individual trader, with respect to all possible counter parties in a number of messages 327 and 329. Based on the information received in the messages 327 and 329, the central system establishes a credit matrix for all individual traders with respect to all possible counter parties.

Figure 4:
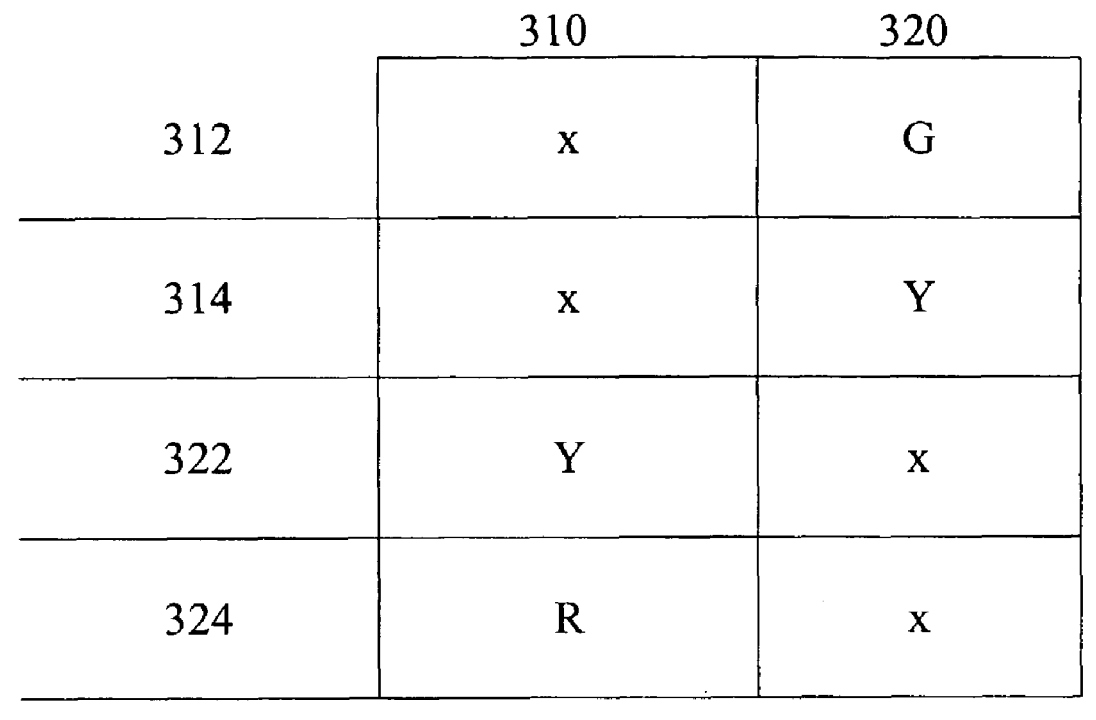

A non-limiting example credit matrix is shown in FIG. 4. In a non-limiting example embodiment, the credit matrix comprises three different levels as described above which can be associated with a color: Green (G) indicating that trading is allowed, Yellow (Y) indicating that trading is restricted, and Red (R) indicating that trading is not allowed. In the credit matrix in FIG. 4, it is assumed that trading with traders of the same member is not allowed, and this is indicated with "x" in the matrix.

When a trader logs on to the central system, the following example messages may be sent. First in a message 331, a trader 312 sends a login request to the central system 300. The central system verifies that trader is allowed to create a trading session and returns a Login OK message 333 thereby establishing a trading session.

Next, the trader requests his credit rating key in a request message 335. The credit rating key is a unique code used by each trader to establish the credit rating of each order in the orderbook. In response to the credit rating key request 335, the central system creates a key to be used by that particular trader and returns the key to the trader in a message 337. The trader is now enabled to receive order information, and based on the order information, determine the credit rating of each particular order.

Whenever the orderbook of the central system is updated, the content of the orderbook is transmitted as a broadcast message to all traders logged on to the central system. In addition to conventional orderbook broadcast information, each order is coded with a unique code, unique to each member and preferably to each trader and possibly to each order. Using the individual key a trader can, using a conventional decoding algorithm, establish the credit rating for each order in the orderbook. Each order is then displayed indicating the credit rating on a trading screen of each trader. For example the orders can be displayed with different colors as described above in conjunction with FIG. 2.

For example if trader 322 transmits an order to the system 300 in a message 339, the orderbook may change. The system 300 will then transmit a broadcast message 341 indicating the new order from trader 322 with price and volume and an associated coded message indicating the credit rating for the order for each trader when decoded using the trader's own key. The associated coded message is in a non-limiting example embodiment a data field comprising a number of bits that when decoded by the different decoding keys indicates the credit rating of a particular order in accordance with the current credit matrix in the central server.

If the credit matrix according to FIG. 4 was to be applied by the central system 300 and the order in message 339 was credit coded accordingly, the broadcast message 341 would indicate "Y" (Yellow) to the trader 312 when decoded using the key of trader 312.

In order for the market to maintain anonymity, it may be necessary to code the information relating to the credit status of the order with many bits, i.e., the data field as described above will have to be long. Otherwise, it may be too easy to reverse code the information and determine the identity of the counter party for each order, which is not desired. However, the use of many bits too preserve anonymity may burden the bandwidth on the channel between the central system 300 and a particular trader. Hence, there is a trade off between the level of encryption and the available bandwidth. There are some different ways to ease the requirements without lowering the encryption.

First, the orderbook information can be sent only at particular time intervals instead of each time that the orderbook is up-dated, for example only every 0.1, 2, or 10 seconds depending on the performance of the overall system. The time interval of the periodic up-date can further be made dependant on the currently available bandwidth so that the credit rating is transmitted often when there is little other traffic to/from the central server and less often when there is heavier traffic load.

Second, and possibly also as an additional method, the credit rating information can be sent to a trader as the result of a direct query to the central system. In this case there is no need for coding the credit rating since all information relating to credit rating can be transmitted uncoded. This because only the trader initiating the request will receive the credit information relating to the credit rating established for that particular trader. Such a message exchange is shown in message 343 where the trader 312 transmits a query for credit rating, and in message 345 where the central system responds to that request.

The method and system as described herein will enable efficient distribution of credit rating information to traders in an anonymous matching system. The system can be made very flexible and will not require additional hardware. Further the system makes it possible to make the entire orderbook available to each trader and at the same time provide credit rating information for each order in the orderbook.

The invention claimed is:

1. An automated exchange system providing an anonymous market, comprising:

a plurality of remote terminals each useable by a trader; and a central computer server connecting the plurality of remote terminals, wherein the central computer server includes a matching unit for matching trade orders generated using the remote terminals and a memory for storing an order book of trade orders to be matched, wherein the central computer server is configured to:

centrally store credit ratings for a plurality of traders associated with the automated exchange system;

issue an individual and unique decoding key to each of the plurality of traders that is unique to that trader or exchange member associated with that trader;

encode credit rating information associated with a current update of the order book in a format that is only decodable using the individual and unique decoding key associated with each trader or exchange member;

broadcast to the plurality of traders at the plurality of remote terminals an order book message that includes current order book content viewable by a plurality of traders logged onto the system, where the encoded credit rating information is only decodable and viewable by a logged-on trader using the individual and unique decoding key associated with that logged-on trader; and process a trade request received from one of the plurality of remote trading terminals for an order in the current order book, wherein at least one of the plurality of remote terminals is configured to:

receive the broadcast order book message;
decode the encoded credit rating information included in the broadcast order book message using the individual and unique decoding key associated with the trader;
display trade orders of the order book based on the current order book content along with an indication of a credit rating associated with each order based on the decoded credit rating information; and
send the trade request for one of the orders in the current order book, wherein the central computer server is configured to broadcast the order book message to the plurality of remote terminals.

2. The system according to claim 1, wherein one of the plurality of remote terminals is configured to display only orders that a trading party associated with the one of the plurality of remote terminals is free to trade against.

3. The system according to claim 1, wherein the central computer server is configured to encrypt the credit rating information transmitted using an encryption algorithm.

4. The system according to claim 1, wherein the central computer server is configured to broadcast the order book message to a plurality of remote terminals currently connected to the exchange system.

5. The system according to claim 1, wherein the central computer server is configured to transmit a new decoding key to a remote terminal associated with a trader when a credit rating of a counter party is changed.

6. The system according to claim 1, wherein the plurality of traders are each associated with a unique decoding key irrespective of a credit rating established for a trader's counter party.

7. The system according to claim 1, wherein the decoding key associated with the trader is enabled using a signature of the trader.

8. The system according to claim 1, wherein the display indicating different credit ratings of different orders uses different colors.

9. The system according to claim 1, wherein the display includes a credit rating status of a counter party including one of at least three different credit rating levels.

10. The system according to claim 9, wherein the central computer server is configured to broadcast credit rating information at a predetermined time interval.

11. The system according to claim 10, wherein said time interval is set in accordance with a current server traffic load.

12. The system according to claim 1, wherein the central computer server is configured to receive a query from a trader relating to the credit rating of an order in the order book and to respond to such a query.

13. The system according to claim 12, wherein the central computer server is configured to transmit a response message including credit rating information to the trader from whom the query is received.

14. The system according to claim 13, wherein the central computer server is configured to transmit the response message uncoded.

15. A method of disseminating credit rating information, the method comprising the steps of:
storing in a central computer server credit ratings for a plurality of traders associated an automated exchange system;
issuing by the central computer server an individual and unique decoding key to each of the plurality of traders that is unique to that trader or to an exchange member associated with that trader;
encoding by the central computer credit rating information associated with a current update of an order book in a format that is only decodable using the individual and unique decoding key associated with each trader or exchange member;
broadcasting by the central computer to the plurality of traders at the plurality of remote terminals an order book update message that includes current order book content viewable by a plurality of traders logged onto the system, where the encoded credit rating information is only decodable and viewable by a logged-on trader using the individual and unique decoding key associated with that logged-on trader;
receiving by at least one of the plurality of remote terminals the broadcast order book update message;
decoding by the at least one of the plurality of remote terminals the encoded credit rating information included in the broadcast order book message using the individual and unique decoding key associated with the trader;
displaying orders of the order book based on the current order book content along with an indication of a credit rating associated with each order based on the decoded credit rating information; and
sending a trade request for one of the orders in the current order book, wherein the same order book message is broadcast to the plurality of remote terminals logged onto the system.

16. The method according to claim 15, wherein only orders that a trading party is free to trade against are displayed.

17. The method according to claim 15, wherein the broadcast credit rating information is encrypted using an encryption algorithm.

18. The method according to claim 15, wherein the central computer server broadcasts the order book update message to the plurality of remote terminals currently connected to the exchange system.

19. The method according to claim 15, wherein a new decoding key is transmitted to a trader when a credit rating of a counter party is changed.

20. The method according to claim 15, wherein the plurality of traders are each associated with a unique decoding key irrespective of a credit rating established for a trader's counter party.

21. The method according to claim 15, wherein the decoding key of a trader is enabled using a signature of the trader authorized by the system.

22. The method according to claim 15, wherein the displaying orders indicates different credit ratings of different orders using different colors.

23. The method according to claim 15, wherein the displaying orders includes a credit rating status of a counter party including one of at least three different credit rating levels.

24. The method according to claim 23, wherein said at least three levels include one level indicating that trading is allowed and one level indicating that trading is forbidden.

25. The method according to claim 15, wherein credit rating information is broadcast at predetermined time intervals.

26. The method according to claim 25, wherein said time interval is set in accordance with a current server traffic load.

27. The method according to claim 15, wherein the central computer server transmits credit rating information to a particular trader as a response to a query sent by the particular trader.

28. A trader terminal for connection to a central server, the central sever connectable to a plurality of trader terminals for matching bids and offers, the trader terminal configured to:
store a key for decoding a portion of a current order book message from the central server, where the decoding key is individual and unique to each trader or exchange member associated with that trader;

receive the current order book message sent from the central sever to the plurality of trader terminals, the current order book message including information relating to orders in the central server and encoded credit rating information associated with each of the orders, where the encoded credit rating information is only decodable by using the stored individual and unique decoding key;

decode the encoded credit rating information included in the received order book message using the stored individual and unique decoding key, where at least some of a current order book content included in the order book message is viewable by all of the plurality of trader terminals without using an individual and unique decoding key;

display orders of the order book based on the current order book content along with an indication of a credit rating associated with each order based on the decoded credit rating information; and send a trade request to the central server for one of the displayed orders, wherein the same order book message is broadcast to all receiving plurality of trader terminals.

29. The trader terminal according to claim 28 further configured to send a query to the central server requesting credit information on orders currently stored in the central server.

30. The trader terminal according to claim 28 further configured to display each order using a particular color indicating the credit rating of each order.

31. The trader terminal according to claim 30, wherein a number of the colors is at least three.

\* \* \* \* \*